United States Patent
Trilli et al.

(10) Patent No.: US 7,231,659 B2
(45) Date of Patent: Jun. 12, 2007

(54) ENTITY AUTHENTICATION IN A SHARED HOSTING COMPUTER NETWORK ENVIRONMENT

(75) Inventors: Kevin Trilli, San Francisco, CA (US); Ben Golub, San Jose, CA (US); Owen Cheung, Hillsborough, CA (US); Wentsung Hsiao, Fremont, CA (US)

(73) Assignee: Verisign, Inc., Mountain View, CA (US)

( * ) Notice: Subject to any disclaimer, the term of this patent is extended or adjusted under 35 U.S.C. 154(b) by 553 days.

(21) Appl. No.: 10/071,548

(22) Filed: Feb. 8, 2002

(65) Prior Publication Data

US 2003/0028762 A1 Feb. 6, 2003

Related U.S. Application Data

(60) Provisional application No. 60/309,203, filed on Jul. 31, 2001.

(51) Int. Cl.
*H04L 9/32* (2006.01)
*H04L 29/00* (2006.01)

(52) U.S. Cl. ............. 726/3; 726/5; 726/6; 726/10; 713/157

(58) Field of Classification Search ........... 713/202, 713/157; 726/10
See application file for complete search history.

(56) References Cited

U.S. PATENT DOCUMENTS

| 5,369,705 | A | | 11/1994 | Bird et al. | |
| 5,396,614 | A | | 3/1995 | Khalidi et al. | |
| 5,602,918 | A | * | 2/1997 | Chen et al. | 713/153 |
| 5,784,463 | A | * | 7/1998 | Chen et al. | 713/171 |
| 6,035,402 | A | * | 3/2000 | Vaeth et al. | 713/201 |
| 6,185,678 | B1 | | 2/2001 | Arbaugh et al. | |
| 6,263,447 | B1 | | 7/2001 | French | 713/201 |
| 6,282,658 | B2 | | 8/2001 | French | 713/201 |
| 6,564,320 | B1 | * | 5/2003 | de Silva et al. | 713/156 |

(Continued)

FOREIGN PATENT DOCUMENTS

WO    WO 99/60482    11/1999

(Continued)

OTHER PUBLICATIONS

Verisign Authentication Services, [Online], Verisign, Inc. USA, Retrieved from the Internet: <URL:http://www.verisign.com/rsc/wp/certshare>; first posted Mar. 22, 2000.*

(Continued)

*Primary Examiner*—Kambiz Zand
*Assistant Examiner*—Thomas M. Szymanski
(74) *Attorney, Agent, or Firm*—Kenyon & Kenyon LLP

(57) ABSTRACT

Apparati, methods, and computer readable media for authenticating an entity (9) in a shared hosting computer network (4) environment. A service provider computer (2) contains a plurality of entity sites (5). Connected to the service provider computer (2), a trusted third party computer (1) is adapted to provide a conglomerated authenticity certification to the service provider computer (2). Coupled to the trusted third party computer (1) is a means (10) for enabling an entity (9) to seek to convert the conglomerated authenticity certification into an individualized authenticity certification covering that entity's site (5).

26 Claims, 3 Drawing Sheets

U.S. PATENT DOCUMENTS

| | | | |
|---|---|---|---|
| 6,883,100 B1* | 4/2005 | Elley et al. | 713/201 |
| 2001/0047484 A1 | 11/2001 | Medvinsky et al. | |
| 2002/0077078 A1 | 6/2002 | Antti | |
| 2002/0112157 A1* | 8/2002 | Doyle et al. | 713/157 |

FOREIGN PATENT DOCUMENTS

| | | |
|---|---|---|
| WO | WO 00/46681 A1 | 8/2000 |

OTHER PUBLICATIONS

WWW.FLAGBOX.COM is a Verisign secure site [Online], Dec. 11, 2001, USA, Retrieved from the internet <URL:https://digitalid.verisign.com/cgi-bin/dcssplash.exe?form_file=../fdf/dcssplash/fdf&domain_n>.*

GeoTrust and TruSecure corporation align to deliver safe online exchange transactions and protect B-to-B trading partners [online], Jan. 10, 2001, USA, Retrieved from internet <URL:http://www.truesecure.com/html/news/press/2001/01_10_2001_geo1.shtml>.*

GeoTrust Acquires Equifax Digital Certificate Business [online], Sep. 25, 2001, USA, Retrieved from the Internet <URL:http://www.equifaxsecure.com/digitalcertificates/dc_press09252001.html>.*

Verisign Secure Site (www.directoneusa.com) <http://web.archive.org/web/20000408183155/digitalid.verisign.com/cgi-bin/Xquery.exe?Template=authCertByIssuer&form_file=../fdf/authCertByIssuer.fdf&issuerSerial=123478577abf6a3d58519c77b8b85c> retrieved online Feb. 14, 2006 from <http://web.archive.org> Apr. 8, 2000 of (digitalid.verisign.com), p. 1.*

Verisign Secure Site (caixadirecta.cgd.pt) <http://web.archive.org/web/20000607212848/digitalid.com/cgi-bin/Xquery.exe?Template=authCertByIssuer&form_file=../fdf/authCertByIssuer.fdf&issuerSerial=037697b5a8a16febe769b72c0e2778> retrieved online Feb. 14, 2006, from <http://web.archive.org> Jun. 7, 2000 of (digitalid.verisign.com), p. 1.*

Server FAQ, <http://web.archive.org/web/20000313004723/http://digitalid.verisign.com/ask_GlobalID.htm> retrieved online Feb. 13, 2006, from <http://web.archive.org> Mar. 13, 2000 of (digitalid.verisign.com), p. 1-6.*

ISP Enrollment Help, <http://web.archive.org/web/20000606094647/http://digitalid.verisign.com/ISPdetails.html> retrieved online Feb. 13, 2006, from <http://web.archive.org> Jun. 6, 2000 of (digitalid.verisign.com), p. 1-5.*

Client Enrollment, <http://web.archive.org/web/20000303222330/http://digitalid.verisign.com/client/chooseid.htm> retrieved online Feb. 13, 2006, from <http://web.archive.org> Mar. 3, 2000 of (digitalid.verisign.com), p. 1.*

Whois—a Whatis.com definition <http://searchnetworking.techtarget.com/sDefinition/0,290660,sid7_gci213362,00.html> retrieved online Feb. 14, 2006, p. 1-2.*

VeriSign Authentication Services, [online], VeriSign, Inc, U.S.A., Retrieved from the Internet: URL:http://www.verisign.com/rsc/wp/certshare>; first posted Mar. 22, 2000.

GeoTrust Acquires Equifax Digital Certificate Business [online], Sep. 25, 2001, U.S.A., Retrieved from the Internet: <URL:http://www.equifaxsecure.com/digitalcertificates/dc_press09252001.html>.

GeoTrust and TruSecure Corporation Align to Deliver Safe Online Exchange Transactions and Protect B-to-B Trading Partners [online], Jan. 10, 2001, U.S.A., Retrieved from the Internet <URL:http://www.truesecure.com/html/news/press/2001/01_10_2001_geo1.shtml>.

GenuOne, Inc. announces strategic acquisition, press release, Nov. 14, 2001, U.S.A.

WWW.THEFLAGBOX.COM is a VeriSign Secure Site [online], Dec. 11, 2001, U.S.A., Retrieved from the Internet <URL:https//digitalid.verisign.com/cgi-bin/dcssplash.exe?form_file=../fdf/dcssplash/fdf&domain_n.

* cited by examiner

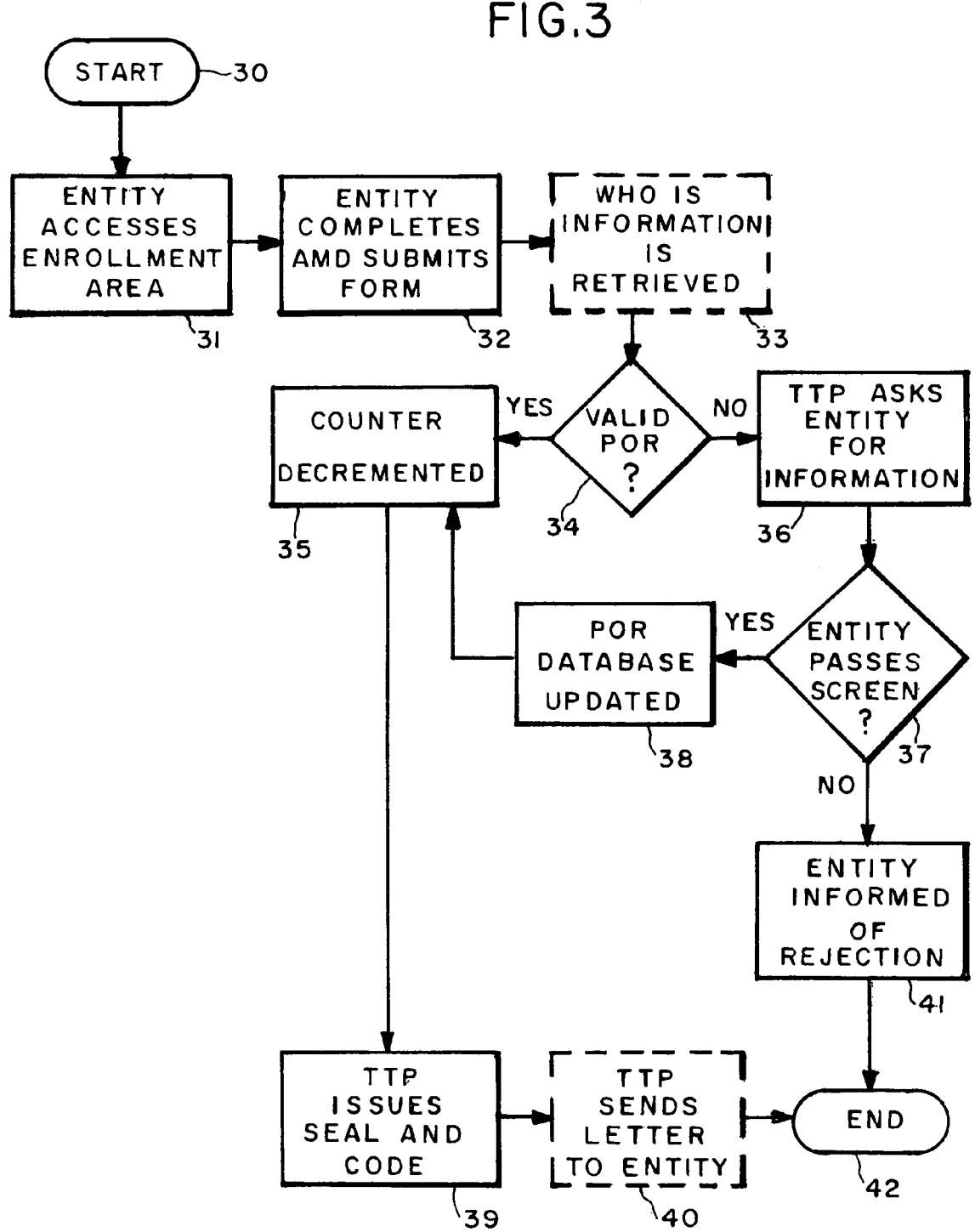

ENTITY AUTHENTICATION IN A SHARED HOSTING COMPUTER NETWORK ENVIRONMENT

RELATED APPLICATION

This patent application claims priority upon, and incorporates by reference in its entirety, U.S. provisional patent application Ser. No. 60/309,203 filed Jul. 31, 2001 and entitled "Organizational Authentication in Shared Hosting SSL Environments".

TECHNICAL FIELD

This invention pertains to the field of authenticating entities, such as individuals, companies, and charitable organizations, on a computer network in which a plurality of entities are hosted on the same server computer.

BACKGROUND ART

In a computer network such as the Internet, it is common for a plurality of entities to be hosted on a single server computer. For example, several entities may wish to have their Websites hosted on a single computer to save costs associated with purchasing and maintaining a server computer. This is called a shared hosting environment. It is common for these entities to wish to have their Websites authenticated by a trusted third party. An example of such a trusted third party is a certification authority such as VeriSign, Inc. of Mountain View, Calif. The authentication establishes that the entity is legitimate and gives assurance to others, such as potential customers of the entity, that they may safely conduct business with the entity. The authentication may take the form of a digital certificate using public key cryptography. Authentication and encryption can be combined in a protocol such as SSL (Secure Sockets Layer). Alternatively, non-cryptographic authentication may be used, such as a seal or a plug-in software module containing evidence of authentication by the trusted third party.

In a shared hosting environment, the trusted third party typically issues a digital certificate to the owner or operator of the server computer, e.g., an Internet service provider (ISP), but does not issue individual digital certificates to the entities, due to limitations in the HTTP (hypertext transfer protocol) and SSL protocols. Therefore, Internet service providers using SSL in a shared hosting environment typically use a shared SSL digital certificate that has been authenticated and issued to the Internet service provider but not to the individual entities. This is referred to as "shared SSL" and is popular in lower-end Websites and entry-level hosting plans. In shared SSL, the Website automatically redirects from the entity's site (e.g., http://www.entity.com) to a secure page hosted by the Internet service provider (e.g., https://secured.isp.com or https://*.isp.com, where the wildcard character * can represent any hostname, such as the name of the entity). In HTTPS, the "S" stands for "secure." If a customer of the entity attempts to obtain more information about the entity by means of clicking on the security padlock icon displayed by his or her browser, the customer will obtain information about the Internet service provider, since the ISP is the certificate holder. The customer will not be able to have the assurance that a trusted third party has performed due diligence on the entity itself.

In shared SSL, the ISP may be tempted to allow the entities hosted by the ISP to use the ISP's certificate as issued by the trusted third party. This may constitute a violation of the agreement between the ISP and the trusted third party, especially when the ISP charges for such a service.

The present invention provides a means for a trusted third party to provide authentication of individual entities in a shared hosting environment, without needing to change the HTTP and SSL protocols.

DISCLOSURE OF INVENTION

The present invention is a suite of apparati, methods, and computer readable media for authenticating an entity (9) in a shared hosting computer network (4) environment. A service provider computer (2) contains a plurality of entity sites (5). Connected to the service provider computer (2), a trusted third party computer (1) is adapted to provide a conglomerated authenticity certification to the service provider computer (2). Coupled to the trusted third party computer (1) is a means (10) for enabling an entity (9) to seek to convert the conglomerated authenticity certification into an individualized authenticity certification covering that entity's site (5).

BRIEF DESCRIPTION OF THE DRAWINGS

These and other more detailed and specific objects and features of the present invention are more fully disclosed in the following specification, reference being had to the accompanying drawings, in which:

FIG. 3 is a flow chart illustrating how, in the present invention, an entity 9 may seek to obtain individualized authenticity certification from the trusted third party 1.

DETAILED DESCRIPTION OF THE PREFERRED EMBODIMENTS

Figure 1:
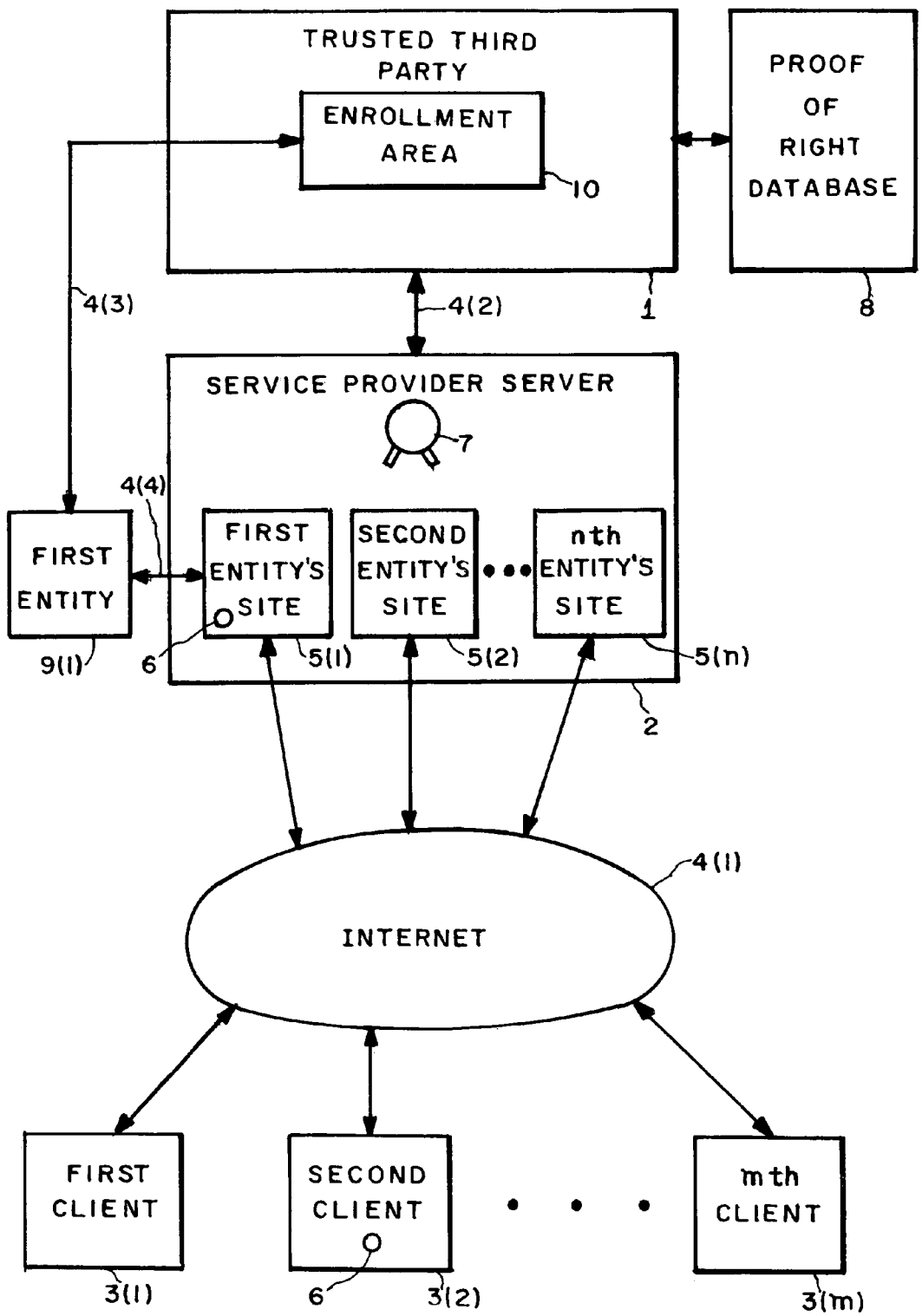
FIG. 1 is a block diagram illustrating elements of the present invention.

FIG. 1 illustrates the basic configuration of the present invention. A service provider server computer 2 hosts a plurality of sites (locations in a storage area) 5 on behalf of a plurality of entities 9. An entity 9 may be an individual or organization, e.g., a corporation, a non-profit organization, or a government agency. In the preferred embodiment, site 5 comprises one or more pages on the World Wide Web, but in the general case, access to a site 5 may be achieved by means other than the World Wide Web, e.g., by file transfer protocol (FTP). FIG. 1 illustrates n entity sites 5. n can be any positive integer. For purposes of simplifying FIG. 1, only the first entity 9(1) is illustrated.

A trusted third party 1 is connected to service provider server computer 2 over link 4(2). Trusted third party 1 may be a certification authority such as VeriSign, Inc. of Mountain View, Calif. Trusted third party 1 is authorized to certify the authenticity of service provider 2, e.g. by issuing a digital certificate using public key cryptography, and processing under normal authentication and verification procedures. This certification may be evidenced by a seal 7, which may be displayed on the service provider's Website 2. In this patent application, "service provider", "service provider server", "service provider server computer", and "service provider's Website" are all referred to using the numeral 2. Similarly, "trusted third party" and "trusted third party computer" are both referred to using the numeral 1.

An enrollment area 10 situated within, or at least associated with, trusted third party computer 1 provides the means for an entity 9 to obtain an individualized authenticity certification of the entity's Website 5 from trusted third party 1. This individualized authenticity certification may be evidenced by a seal 6 that appears on the entity's Website 5, or may be contained in a plug-in module associated with the trusted third party computer 1. FIG. 1 illustrates one entity 9, the first entity 9(1), as having received such certification of its Website 5(1). Each entity 9 communicates with enrollment area 10 over a link 4(3), and with service provider server computer 2 over a link (4).

Included within, coupled to, or otherwise associated with trusted third party computer 1 is a proof of right database 8, which is used to assist trusted third party 1 in authenticating service provider 2 and entities 9.

A plurality of client computers 3 are connected to various of the entity sites 5 over link 4(1). FIG. 1 illustrates m client computers 3. m can be any positive integer. Each link 4(1), 4(2), 4(3), 4(4) can be any wired or wireless link, such as the public switched telephone network (PSTN), a dedicated network, a local area network (LAN), a wide area network (WAN), the Internet, a virtual private network (VPN), etc. FIG. 1 illustrates link 4(1) as being the Internet.

A client computer 3 typically communicates with an entity Website 5 via browser software that is loaded into the client computer 3. Information from the Website 5 is downloaded over link 4(1) into the client computer 3. If an authentication seal 6 appears on the Website 5, it is downloaded into and displayed on the client computer 3. FIG. 1 illustrates one such seal 6, which has been thus downloaded into and displayed on client computer 3(2). Authentication information for the seal 6 is stored in a database associated with trusted third party computer 1. When the user of client computer 3(2) clicks on the seal 6, the authentication information is downloaded in real-time from the trusted third party computer 1 to the client computer 3(2), where it is displayed to the user. This may be done in a two-step process as described below.

When a plug-in module is used in lieu of a seal 6, the user of the client computer 3(2) downloads the plug-in module from the trusted third party computer 1, e.g., from a Website or database associated with computer 1. At that point, a representation (such as an icon) of the plug-in module may be displayed on the client computer 3(2). Subsequent activation of the plug-in module results in the authentication information being displayed to the user on computer 3(2). The activation of the plug-in module can be accomplished in any manner, for example, by the user clicking on a icon representing the plug-in module, by automatic pre-programmed activation, etc.

Figure 2:
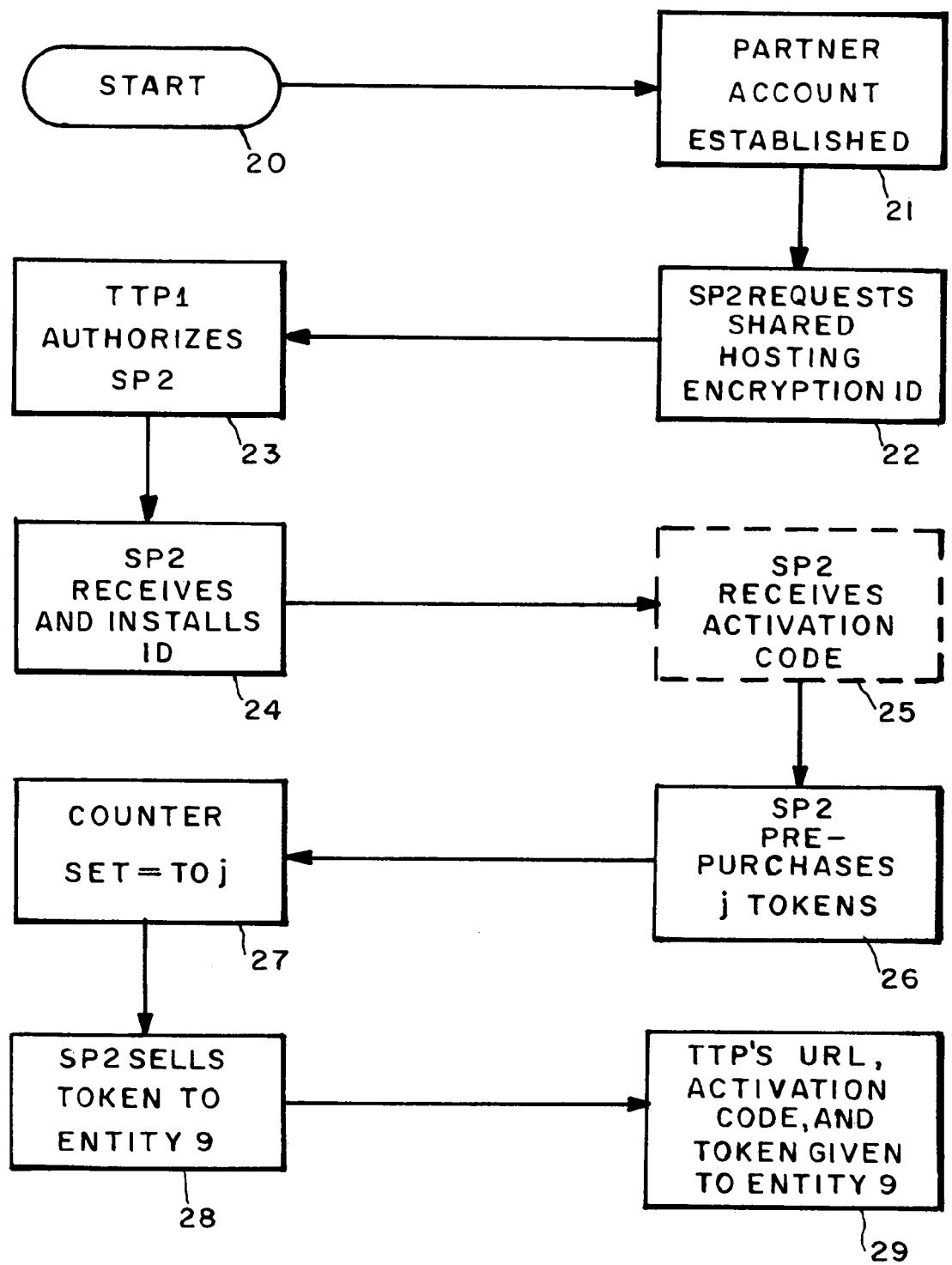
FIG. 2 is a flow chart illustrating how, in the present invention, a trusted third party 1 empowers a service provider 2 to offer a service by which entities 9 hosted on the service provider's computer 2 may seek to obtain individualized authenticity certifications from the trusted third party 1.

FIG. 2 illustrates how the service provider 2 facilitates the provision of individualized authenticity certifications to the entities 9 whose Websites 5 are hosted on the service provider server computer 2. The method begins at step 20. At step 21, a partner account is established between trusted third party 1 and service provider 2. This is normally in the form of a written signed agreement between the two parties 1,2.

At step 22, service provider 2 requests from trusted third party 1 a shared hosting encryption ID. This is a digital certificate issued by the trusted third party 1 plus a license to share it in a certain way. It is sometimes referred to herein as a "conglomerated authenticity certification".

At step 23, trusted third party 1 performs an authorization inquiry with respect to service provider 2. Proof of right database 8 may be used to assist trusted third party 1 in this process. The investigation can take many forms and have different depths, resulting in different levels of digital certificates based upon the depth. For example, trusted third party 1 may investigate whether service provider 2 is registered with competent state and federal governments, verify that service provider 2 has been in business for a certain period of time, and investigate service provider 2's credit rating. If service provider 2 passes the pre-established checks, the method passes to step 24. Otherwise, the method terminates.

At step 24, trusted third party 1 issues the shared hosting encryption ID; service provider 2 receives the shared hosting encryption ID; and service provider 2 installs the shared hosting encryption ID on its computer 2. The digital certificate that is the basis for the shared hosted encryption ID typically contains the following information:

1. The common name (fully qualified domain name) of service provider 2.
2. The organization name of service provider 2. In case provider 2 is a corporation, this is the name of the corporation.
3. The organizational unit (i.e,. the name of the department) within service provider 2 that is the responsible entity.
4. The city where service provider 2 is located.
5. The state where service provider 2 is located.
6. The country where service provider 2 is located.

Items 1 through 6 are called the "distinguished name" of service provider 2.

7. The validity period of the digital certificate (i.e., when it is valid, when it expires).
8. The digital signature of trusted third party 1.

Revocation of such a digital certificate is checked in a separate procedure, in which the revocation is posted on a CRL (certificate revocation list), where it can be viewed by browser software of the checking computer.

If the wildcard symbol * was used as described above, the digital certificate issued to the service provider 2 can be a wildcard certificate.

When service provider server computer 2 installs the shared hosting encryption ID, an icon 7 typically appears on a Web page of computer 2. The icon 7 is evidence that the digital certificate has been issued by the trusted third party 1. The icon 7 may appear in the form of a seal 7. Different types of seals 7 may be used, depending upon the level of the digital certificate. In the preferred embodiment, seal 7 is downloaded onto a client computer 3 that connects to Website 2, and is displayed on the browser of computer 3. A user of client computer 3 then may click on seal 7, enabling the user to view the underlying digital certificate.

In optional step 25, trusted third party 1 sends to service provider server computer 2 an activation code. This is a digital code, typically 16 bytes long, uniquely assigned to the shared hosting encryption ID. The optional activation code provides additional security to the process illustrated in FIG. 3.

In step 26, the service provider 2 pre-purchases from trusted third party 1 a number of seal credit tokens, based upon the number of entities 9 that service provider 2 thinks will wish to purchase individualized authenticity certifications. The tokens may be represented in digital form of a fixed bit length, and have unique or distinctive token numbers.

In step 27, a counter within trusted third party computer 1 is set equal to j, the number of tokens pre-purchased by service provider 2. j can be any positive integer.

In step 28, service provider 2 sells a token to an entity 9 that wishes an individualized certification. The sale can be conducted by any means, e.g., by credit card, digital cash, online, offline, etc.

In step 29, service provider 2 sends to the purchasing entity 9 the address of enrollment area 10 within trusted third party computer 1 where entity 9 can apply for its certification. In the case of the World Wide Web, the address takes the form of a URL (Universal Resource Locator). When the optional activation code is used, it is passed to the purchasing entity 9 by service provider 2. Additionally, service provider server 2 passes a token to the purchasing entity 9. The activation code and the token can be appended to the URL, e.g., as CGI (Common Gateway Interface) script.

FIG. 3 illustrates how an entity 9 applies for an individualized authenticity certification. The method commences at step 30. At step 31, entity 9 accesses enrollment area 10, which displays to entity 9 an enrollment form if entity 9 presents a valid token and optional activation code.

At step 32, entity 9 provides information that is required on the form. This can be done online. The information requested includes the domain name of the entity's Website 5. After completing the enrollment form, entity 9 submits it, e.g. by clicking a "submit" button.

At optional step 33, the submitted domain name of entity 9 is used to obtain registrant information from the WHOIS database, a free look-up service on the Internet.

In step 34, the WHOIS information from step 33 (or the domain name information, if step 33 is omitted) is used as a basis for trusted third party 1 to access proof of right database 8. Proof of right database 8 contains information that tends to establish the authenticity of entities 9. For example, in the case where database 8 is Dun & Bradstreet's global database of more than 64 million companies, the entity's D-U-N-S number is identified, an inquiry is made as to whether the entity 9 is a registered business, and whether the entity 9 has the right to use the domain name of the entity's Website 5. Various databases 8 can be used, based upon a pre-established level of checking that is deemed necessary in order for trusted third party 1 to grant individualized authenticity certification to an entity 9.

If entity 9 passes the authenticity checks of step 34, step 35 is performed, wherein trusted third party 1 decrements the aforesaid token counter to indicate that one of the tokens is being extinguished.

Then, at step 39, trusted third party 1 issues an individualized authenticity certification to entity 9. This can be in the form of a seal 6, which is typically a different (lower) level of seal than seal 7 issued to service provider 2. Some computer code normally accompanies seal 6. The code allows a computer 3 user who clicks on seal 6 to access an information page. Preferably, part of the code is first downloaded into client computer 3, whose browser displays a dialog box showing that trusted third party 1 signed the downloaded program. Thus the user will have confidence of the source of the program. Then the program posts a request, which may be encrypted using SSL, to trusted third party 1 to retrieve the information page, which is then displayed to the user. The information page can show information about entity 9, such as the domain name of the entity's Website 5, the entity's name, and the city, state, and country where the entity 9 is located; information about the service provider 2, such as the common name of the certificate (three-level domain name); the status of the certificate (whether valid or expired); and special information, for example, information about trusted third party 1.

As stated above, if a plug-in module is used in lieu of a seal 6, activation of the plug-in module causes the information page to be displayed to the user.

For an example as to what is displayed to the user of client computer 3 on the information page, let us assume that the domain name is theflagbox.com, entity 9 is Motherload Product Development Corp., trusted third party 1 is VeriSign, Inc., and the purveyor of database 8 is Dun & Bradstreet. Then the information page may state:

"www.theflagbox.com is a VeriSign Secure Site. The Secure Site Seal you clicked on indicates that the information you send to this site is secured using SSL encryption, the industry standard method for safely transferring information over the Internet by the Website hosting company, with permission of the Website owner. The Seal also indicates that VeriSign and Dun & Bradstreet have verified that this Website is owned by an authenticated business and is not an imposter's Website. VeriSign and Dun and Bradstreet have authenticated this site's identity. The organization Motherload Product Development Corp. is the registrant of the domain name theflagbox.com. Dun & Bradstreet has performed a best in class investigation leveraging D&B's global database of more than 64 million D-U-N-S numbered entities to confirm that Motherload Product Development Corp. is a registered business. The D-U-N-S number is a unique nine digit identifier of single business entities that has become the standard for keeping track of the world's businesses. This site is secured by a VeriSign SSL server certificate. Motherload Product Development Corp. has given permission to VeriSign, Inc. to secure its Website with a VeriSign digital server certificate, which uses industry standard SSL technology to encrypt information, such as credit card numbers, sent to SSL secured pages on this site. To ensure that you are visiting a VeriSign Secure Site, check that: the original URL of the site you are visiting is theflagbox.com; and the URL of this page is https://checkout.verisign.com. Copyright 2001 VeriSign, Inc. All rights reserved."

In optional step 40, trusted third party 1 sends a surface mail letter to entity 9 to verify that entity 9 had the authority to request the individualized authenticity certification. The letter typically specifies a time period after which it is assumed that entity 9 had the authority; the transaction then becomes legitimate if entity 9 does not object within said time period. The method then ends at step 42.

If entity 9 was not authenticated using database 8 in step 34, the method passes to step 36, where trusted third party 1, typically in an offline fashion, asks entity 9 for information that would establish the authenticity of entity 9. For example, trusted third party 1 may ask entity 9 for a notarized copy of its business license.

Then, at step 37, trusted third party 1 asks whether entity 9 has passed the checks that were undertaken in step 36. If yes, database 8 is updated in step 38 and control passes to step 35.

If entity 9 fails the checks set forth in step 37, control passes to step 41, where trusted third party 1 informs entity 9 of its rejection. Specifically, trusted third party 1 might need to inform entity 9 that the registered owner of the domain name has changed and therefore entity 9 must re-enroll; or that entity 9 could not be authenticated and therefore does not qualify. Again, the method ends at step 42.

The methods and all of the steps that are illustrated in FIGS. 2 and 3 can be implemented in hardware, firmware, and/or software. They are typically implemented in software modules. Any combination of the software modules can be packaged and sold as a product on a removal medium, such as a floppy disk, compact disk, or DVD.

Typically, the shared hosting encryption ID that trusted third party 1 provides to service provider 2 is valid for a certain period of time only. When the time period expires, the underlying digital certificate is amended to indicate that the certificate is no longer valid. Similarly, trusted third party 1 may need to revoke the certificate issued to service provider 2, e.g. because service provider 2 has violated the terms of the partner account established between trusted third party 1 and service provider 2. Again, revocation of the certificate is enforced by means of trusted third party 1 amending the certificate's status field to indicate that the certificate is no longer valid.

Likewise, expiration and revocation of an individualized authenticity certification issued to an entity 9 can be enforced by means of trusted third party 1 recalling a seal 6 issued to an entity 9 and/or by modifying the information page behind seal 6.

It typically costs more for a digital certificate than for space on a server 2. Thus, using this invention, an entity 9 is able to obtain authenticity certification for less money than it would cost to obtain its own high-level digital certificate at the same level as service provider 2. Entity 9 is able to display business authentication information to its customers and potential customers, thus enabling more customers to feel secure in doing business with its site 5. In the case where entity 9 is a charitable organization, potential donors will feel more comfortable in donating money to the charitable organization 9.

This invention helps trusted third party 1 provide a more secure PKI (public key infrastructure) in a shared hosting environment.

The invention allows service provider 2 to provide a more secure offering to its entity 9 subscribers, while reducing its risk compared with the shared SSL technique of the prior art.

Finally, the invention allows customers 3 to feel confident that sites 5 displaying appropriate seals 6 have been authenticated by a trusted third party 1 and that due diligence has been performed, thus providing assurances of legitimacy.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. Apparatus for authenticating an entity in a shared hosting computer network environment, said apparatus comprising:
    a service provider computer containing a plurality of entity sites;
    connected to the service provider computer, a trusted third party computer adapted to provide a conglomerated authenticity certification to the service provider computer; and
    coupled to the trusted third party computer, converting means for enabling an entity to seek to convert the conglomerated authenticity certification into an individualized authenticity certification covering that entity's site, wherein the individualized authenticity certification is distinct from the conglomerated authenticity certification and the individualized authenticity certifications are different for different entity sites.

2. The apparatus of claim 1, wherein the converting means comprises a plurality of conversion tokens pre-purchased from the trusted third party by the service provider.

3. The apparatus of claim 1, wherein at least one entity's site has received an individualized authenticity certification;
    at least one client computer is connected to said authenticated entity site over the computer network; and
    a seal evidencing the entity site's authentication is displayed on the client computer.

4. The apparatus of claim 3, wherein clicking on the seal results in authentication information being displayed on the client computer.

5. The apparatus of claim 1, wherein at least one entity's site has received an individualized authenticity certification;
    at least one client computer is connected to said authenticated entity site over the computer network; and
    the client computer downloads from the trusted third party computer a plug-in module, said plug-in module containing evidence of the individualized authenticity certification.

6. The apparatus of claim 5, wherein activation of the plug-in module results in authentication information being displayed on the client computer.

7. A method by which a trusted third party empowers a service provider to offer to entities having sites hosted on said service provider's computer an ability to seek from the trusted third party individualized authenticity certifications covering said entities'sites, said method comprising the steps of:
    the trusted third party providing the service provider with a conglomerated authenticity certification; and
    the service provider making available to the entities a conversion means by which the entities may seek individualized authenticity certifications from the trusted third party, wherein the individualized authenticity certifications are distinct from the conglomerated authenticity certification and the individualized authenticity certifications are different for different entity sites.

8. The method of claim 7, wherein the conversion means comprises a plurality of digital tokens pre-purchased from the trusted third party by the service provider.

9. The method of claim 8, wherein the service provider sends a token, an activation code, and an address of the trusted third party's computer to an entity wishing to obtain an individualized authenticity certification.

10. In a computer network in which a service provider computer hosts a plurality of entities, a method by which an entity desiring authentication applies for an individualized authenticity certification from a trusted third party, said method comprising the steps of:
    the trusted third party providing a conglomerated authenticity certification to the service provider computer;
    the service provider computer making available to the desirous entity an activation tool; and
    the desirous entity presenting the activation tool to the trusted third party, thereby petitioning the trusted third party to convert the conglomerated authenticity certification into an individualized authenticity certification covering the desirous entity's site, wherein the individualized authenticity certification is distinct from the conglomerated authenticity certification and the individualized authenticity certifications are different for different entity sites.

11. The method of claim 10, wherein the activation tool comprises a digital token that has been pre-purchased from the trusted third party by the service provider.

12. The method of claim 10, wherein the activation tool comprises a digital activation code.

13. The method of claim 10, wherein the activation tool is appended to a URL of a computer associated with the trusted third party.

14. The method of claim 10, wherein the desirous entity presents its domain name to the trusted third party.

15. The method of claim 14, wherein the trusted third party uses the domain name to access a WHOIS database.

16. The method of claim 10, wherein the trusted third party accesses a proof of right database based upon information provided by the desirous entity.

17. The method of claim 16, wherein, when the desirous entity is deemed acceptable according to the proof of right database, the trusted third party issues an individualized authenticity certification to the desirous entity.

18. The method of claim 17, wherein the activation tool is a digital token, and the trusted third party decrements a token counter.

19. The method of claim 17, wherein the individualized authenticity certification is evidenced by a seal.

20. The method of claim 19, wherein a user computer accesses a Website of the authenticated entity, the seal is downloaded onto the user computer, and the seal is displayed on the user computer.

21. The method of claim 20, wherein clicking on the seal on the user computer causes an information page to be displayed on the user computer, said information page containing background information concerning the individualized authenticity certification.

22. The method of claim 17, wherein the individualized authenticity certification is evidenced by a plug-in module.

23. The method of claim 22, wherein a user computer accesses a Website associated with the trusted third party, the plug-in module is downloaded onto the user computer, and a representation of the plug-in module is displayed on the user computer.

24. The method of claim 23, wherein activation of the plug-in module on the user computer causes an information page to be displayed on the user computer, said information page containing background information concerning the individualized authenticity certification.

25. A computer readable medium containing a computer program by which a trusted third party empowers a service provider to offer to entities having sites hosted on said service provider's computer an ability to obtain from the trusted third party individualized authenticity certifications covering said entities' sites, said computer program containing instructions for:

enabling the trusted third party to provide the service provider with a conglomerated authenticity certification; and enabling the service provider to make available to the entities a conversion means by which the entities may seek individualized authenticity certifications from the trusted third party, wherein the individualized authenticity certifications are distinct from the conglomerated authenticity certification and the individualized authenticity certifications are different for different entity sites.

26. A computer readable medium containing a computer program by which an entity having a site hosted on a service provider computer that hosts a plurality of entities' sites can seek authentication from a trusted third party, said computer program containing instructions for:

enabling the trusted third party to provide a conglomerated authenticity certification to the service provider computer;

enabling the service provider computer to make available to the seeking entity an activation tool; and enabling the seeking entity to present the activation tool to the trusted third party, thereby petitioning the trusted third party to convert the conglomerated authenticity certification into an individualized authenticity certification covering the seeking entity's site, wherein the individualized authenticity certification is distinct from the conglomerated authenticity certification and the individualized authenticity certifications are different for different entity sites.

* * * * *